US006724767B1

United States Patent
Chong et al.

(10) Patent No.: US 6,724,767 B1
(45) Date of Patent: Apr. 20, 2004

(54) TWO-DIMENSIONAL QUEUING/DE-QUEUING METHODS AND SYSTEMS FOR IMPLEMENTING THE SAME

(75) Inventors: Simon Chong, Fremont, CA (US); Anguo Tony Huang, Mountain View, CA (US); Man Dieu Trinh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/271,061

(22) Filed: Mar. 16, 1999

Related U.S. Application Data
(60) Provisional application No. 60/090,939, filed on Jun. 27, 1998.

(51) Int. Cl.[7] .......................... H04L 12/28; H04L 12/56
(52) U.S. Cl. ..................... 370/412; 370/413; 709/238; 710/52
(58) Field of Search ................................ 370/412, 413, 370/414, 415, 416, 418; 707/100–104; 709/238; 710/52–56

(56) References Cited

U.S. PATENT DOCUMENTS

| 4,024,507 | A | 5/1977 | Berkling et al. ............. 711/170 |
| 4,586,134 | A | 4/1986 | Norstedt ..................... 709/228 |
| 4,700,294 | A | 10/1987 | Haynes ....................... 341/106 |
| 5,218,687 | A | 6/1993 | Ducuosso et al. .......... 711/128 |

(List continued on next page.)

OTHER PUBLICATIONS

"LAN Emulation Over ATM Version 2—LUNI Specification", The ATM Forum Technical Committee; AF–LANE–0084.00; Jul. 1997; 153 pages.

Passmore et al., "The Virtual LAN Technology Report", Decisys, Inc., 1996, pp. 1–20.

"ATM Internetworking", White Paper, May 1995; pp. 1, 25–49.

Ghani et al., "Hierarchical Scheduling for Integrated ABR/VBR Services in ATM Networks", GLOBECOM 97, IEEE Globecom Telecommunications Conference; pp. 779–784.

Lin, Dong; Constant–Time Dynamic ATM Bandwidth Scheduling for Guaranteed and Best Effort Services with Overbooking: IEEE INFOCOM '97; pp. 398–405.

Chiussi et al., "Virtual Queuing Techniques for ABR Service: Improving ABR/VBR Interaction", IEEE INFOCOM '97; pp. 406–418.

Benmohamed et al., "A Control–Theoretic ABR Explicit Rate Algorithm for ATM Switches with Per–VC Queuing", IEEE Inforcom '98; pp. 183–191.

*Primary Examiner*—Hassan Kizou
*Assistant Examiner*—Saba Tsegaye
(74) *Attorney, Agent, or Firm*—Blakely, Sokoloff, Taylor & Zafman LLP

(57) ABSTRACT

Systems and methods for queuing and de-queuing packets in a two-dimensional link list data structure. A network processor processes data for transmission for a plurality of Virtual Connections (VCs). The processor creates a two-dimensional link list data structure for each VC. The data field of each data packet is stored in one or more buffer memories. Each buffer memory has an associated buffer descriptor that includes a pointer to the location of the buffer memory, and a pointer pointing to the memory of the next buffer descriptor associated with a buffer memory storing data for the same packet. Each data packet also has an associated packet descriptor including a pointer pointing to the memory location of the first buffer descriptor associated with that packet, and a pointer pointing to the memory location of the packet descriptor associated with the next data packet queued for transmission. A VC descriptor for each VC keeps track of the memory locations of the next packet descriptor and the next buffer descriptor to be de-queued, and the memory locations for storing the next packet descriptors and the next buffer descriptors to be queued.

23 Claims, 14 Drawing Sheets

U.S. PATENT DOCUMENTS

| | | | |
|---|---|---|---|
| 5,287,537 A | 2/1994 | Newmark et al. | 712/29 |
| 5,295,135 A | 3/1994 | Kammerl | 370/233 |
| 5,379,297 A | 1/1995 | Glover et al. | 370/234 |
| 5,394,402 A | 2/1995 | Ross | 370/402 |
| 5,414,707 A | 5/1995 | Johnston et al. | 370/395.6 |
| 5,481,536 A | 1/1996 | Reisch et al. | 370/394 |
| 5,515,370 A | 5/1996 | Rau | 370/399 |
| 5,517,488 A | 5/1996 | Miyazaki et al. | 370/225 |
| 5,524,007 A * | 6/1996 | White et al. | 370/419 |
| 5,535,201 A | 7/1996 | Zheng | 370/230.1 |
| 5,539,729 A | 7/1996 | Bodnar | 370/232 |
| 5,555,256 A | 9/1996 | Calamvokis | 370/399 |
| 5,555,265 A | 9/1996 | Kakuma et al. | 370/395.43 |
| 5,564,051 A | 10/1996 | Halliwell et al. | 707/200 |
| 5,574,875 A | 11/1996 | Stansfield et al. | 711/3 |
| 5,590,128 A | 12/1996 | Maloney et al. | 370/260 |
| 5,619,650 A | 4/1997 | Bach et al. | 709/246 |
| 5,638,371 A | 6/1997 | Raychaudhuri et al. | 370/310.2 |
| 5,640,399 A | 6/1997 | Rostoker et al. | 370/392 |
| 5,652,872 A | 7/1997 | Richter et al. | 703/26 |
| 5,659,794 A | 8/1997 | Caldarale et al. | 710/1 |
| 5,664,116 A | 9/1997 | Gaytan et al. | 709/234 |
| 5,684,797 A | 11/1997 | Aznar et al. | 370/390 |
| 5,684,954 A | 11/1997 | Kaiserwerth et al. | 709/236 |
| 5,696,930 A | 12/1997 | Garetz et al. | 710/3 |
| 5,701,300 A | 12/1997 | Jeon et al. | 370/392 |
| 5,726,985 A | 3/1998 | Daniel et al. | 370/382 |
| 5,740,171 A | 4/1998 | Mazzola et al. | 370/392 |
| 5,742,772 A | 4/1998 | Sreenan | 709/226 |
| 5,745,477 A | 4/1998 | Zheng | 370/230 |
| 5,745,790 A | 4/1998 | Oskouy | 710/33 |
| 5,748,630 A | 5/1998 | Bergantino et al. | 370/412 |
| 5,751,709 A | 5/1998 | Rathnavelu | 370/395.4 |
| 5,751,951 A | 5/1998 | Osborne et al. | 709/250 |
| 5,751,955 A | 5/1998 | Sonnier et al. | 714/12 |
| 5,754,530 A | 5/1998 | Awdeh et al. | 370/236 |
| 5,764,895 A | 6/1998 | Chung | 709/250 |
| 5,771,231 A | 6/1998 | Watanabe | 370/377 |
| 5,796,715 A | 8/1998 | Patterson et al. | 370/349 |
| 5,796,978 A | 8/1998 | Yoshioka et al. | 711/206 |
| 5,805,805 A | 9/1998 | Civanlar et al. | 709/220 |
| 5,812,550 A | 9/1998 | Sohn et al. | 370/395.4 |
| 5,825,765 A | 10/1998 | Menzilcioglu et al. | 370/395.71 |
| 5,835,928 A | 11/1998 | Auslander et al. | 711/3 |
| 5,841,772 A | 11/1998 | Daniel et al. | 370/395.4 |
| 5,848,068 A | 12/1998 | Daniel et al. | 370/395.43 |
| 5,857,075 A | 1/1999 | Chung | 709/223 |
| 5,867,712 A | 2/1999 | Shaw et al. | 717/127 |
| 5,870,561 A | 2/1999 | Jarvis et al. | 709/238 |
| 5,875,173 A | 2/1999 | Ohgane et al. | 370/230 |
| 5,878,232 A | 3/1999 | Marimuthu | 709/249 |
| 5,905,874 A | 5/1999 | Johnson | 709/250 |
| 5,909,441 A | 6/1999 | Alexander, Jr. et al. | 370/395.54 |
| 5,910,955 A | 6/1999 | Nishimura et al. | 370/401 |
| 5,912,892 A | 6/1999 | Barnhart et al. | 370/397 |
| 5,935,249 A | 8/1999 | Stern et al. | 713/201 |
| 5,943,693 A | 8/1999 | Barth | 711/220 |
| 5,956,336 A | 9/1999 | Loschke et al. | 370/394 |
| 5,974,457 A | 10/1999 | Waclawsky et al. | 709/224 |
| 5,974,462 A | 10/1999 | Aman et al. | 709/225 |
| 5,978,951 A | 11/1999 | Lawler et al. | 714/758 |
| 5,983,332 A | 11/1999 | Watkins | 711/202 |
| 5,991,854 A | 11/1999 | Watkins | 711/135 |
| 6,003,027 A | 12/1999 | Prager | 707/5 |
| 6,005,943 A | 12/1999 | Cohen et al. | 380/30 |
| 6,021,263 A | 2/2000 | Kujoory et al. | 709/232 |
| 6,041,059 A | 3/2000 | Joffe et al. | 370/412 |
| 6,052,383 A | 4/2000 | Stoner et al. | 370/466 |
| 6,058,434 A | 5/2000 | Wilt et al. | 709/310 |
| 6,073,175 A | 6/2000 | Tavs et al. | 709/226 |
| 6,085,252 A | 7/2000 | Zhu et al. | 709/231 |
| 6,104,700 A | 8/2000 | Haddock et al. | 370/235 |
| 6,119,170 A | 9/2000 | Schoffelman et al. | 709/244 |
| 6,144,996 A | 11/2000 | Starnes et al. | 709/217 |
| 6,154,776 A | 11/2000 | Martin | 709/226 |
| 6,163,541 A | 12/2000 | Casey et al. | 370/395.51 |
| 6,167,049 A | 12/2000 | Pei et al. | 370/395.43 |
| 6,172,991 B1 | 1/2001 | Mori | 370/474 |
| 6,198,751 B1 | 3/2001 | Dorsey et al. | 370/466 |
| 6,201,971 B1 | 3/2001 | Purnadi et al. | 455/450 |
| 6,223,292 B1 | 4/2001 | Dean et al. | 713/202 |
| 6,269,396 B1 | 7/2001 | Shah et al. | 709/223 |
| 6,272,544 B1 | 8/2001 | Mullen | 709/226 |
| 6,285,674 B1 | 9/2001 | Soni et al. | 370/390 |
| 6,285,684 B1 | 9/2001 | Suzuki et al. | 370/471 |
| 6,311,212 B1 | 10/2001 | Chong et al. | 709/212 |
| 6,311,238 B1 | 10/2001 | Hebert | 710/65 |
| 6,337,863 B1 | 1/2002 | Nair et al. | 370/395.3 |
| 6,343,078 B1 | 1/2002 | Bronstein et al. | 370/400 |
| 6,351,474 B1 * | 2/2002 | Robinett et al. | 370/486 |
| 6,411,625 B1 | 6/2002 | Furuhashi et al. | 370/345.53 |
| 6,425,067 B1 | 7/2002 | Chong et al. | 711/220 |
| 6,452,923 B1 | 9/2002 | Gerszberg et al. | 370/352 |
| 6,522,188 B1 * | 2/2003 | Poole | 327/407 |

* cited by examiner

TWO-DIMENSIONAL QUEUING/DE-QUEUING METHODS AND SYSTEMS FOR IMPLEMENTING THE SAME

CROSS REFERENCE TO RELATED APPLICATIONS

This application is related to U.S. Provisional Patent Application Ser. No. 60/090,939, filed Jun. 27, 1998, entitled "Network Accelerator Subsystem Based on Single-Chip Network Processor and Interface Protocol," the disclosure of which is hereby incorporated by reference in its entirety.

BACKGROUND OF THE INVENTION

The present invention relates in general to buffer management in networking systems, and more particularly to a two-dimensional link list data structure for queuing and de-queuing packets.

The need for faster communication among computers and other systems requires ever faster and more efficient networks. Today, networks typically use an amalgam of various software and hardware to implement a variety of network functions and standards. Network devices such as client computer systems, servers, hubs, routers, switches, network backbones, etc., are each complex devices that require digital processing in hardware and software to facilitate network communication. Some tasks performed in a network device include translation between different network standards such as Ethernet and Asynchronous Transfer Mode (ATM), reformatting of data, traffic scheduling, routing of data cells, packets messages, etc. Depending on the particular protocol being implemented, some tasks may be performed at different points in the network. Also, because of the need for compatibility, flexibility and making changes to network functionality, much of today's network processing is implemented in software which is relatively slow compared to the bandwidth demanded by the network and applications running on the network. For example, the Layer 3 and Layer 4 functions of the OSI 7-Layer Model are typically implemented in software running on one or more devices on the network.

Network system performance is greatly affected by device architectures and CPU bandwidth. In conventional networking devices, for example, the main CPU implements software to queue a packet into a packet link list. This degrades CPU performance, especially where there is a high volume of data traffic, as the CPU is required to oversee and implement processor intensive data buffering and transfer functions. This also results in increased memory access times, which degrades data transfer speed and network efficiency. Furthermore, in conventional networking systems, only one packet is processed at a time, which can lead to slow throughput due to inefficient memory allocation and access techniques. In network systems where a variety of data packet types and sizes are processed, memory access and allocation can be a serious problem.

Some network systems use a link-list data structure for queuing and de-queuing packets. However, these systems typically require a two-stage lookup in an off-chip memory to determine which packets are to be de-queued. This results in slow throughput and increased processor use, thereby resulting in less than optimal performance.

SUMMARY OF THE INVENTION

The present invention provides novel systems and methods for queuing and de-queuing packets in a two-dimensional link list data structure. A network processor receives data for transmission for a plurality of Virtual Connections (VCs). The processor reassembles data cells and frames into data packets and creates a two-dimensional link list data structure for each VC. The data field of each data packet is stored in one or more buffer memories. Each buffer memory has an associated buffer descriptor that includes a pointer to the location of the buffer memory, and a pointer pointing to the memory location of the next buffer descriptor associated with a buffer memory storing data for the same packet. Each data packet also has an associated packet descriptor including a pointer pointing to the memory location of the first buffer descriptor associated with that packet, and a pointer pointing to the memory location of the packet descriptor associated with the next data packet queued for transmission. A VC descriptor for each VC keeps track of the memory locations of the next packet descriptor and the next buffer descriptor to be de-queued, and the memory locations for storing the next packet descriptors and the next buffer descriptors to be queued. The two-dimensional link list data structure of the present invention allows for a one-stage look-up in an internal memory.

According to an aspect of the invention, a method is provided for queuing one or more data packets for transmission for a virtual connection (VC) in a networking system device having an internal memory, wherein each of the data packets has a data field. The method typically comprises the step of creating a VC queue descriptor associated with a first VC. The VC queue descriptor typically includes first, second, third and fourth pointers pointing to first, second, third and fourth memory spaces, respectively, wherein each of the first, second, third and fourth pointers has a value indicating the location of the associated memory space. The method also typically includes the steps of storing a first packet descriptor associated with a first one of the packets to the first memory space such that the first pointer points to the first packet descriptor, the first packet descriptor including a next packet descriptor pointer pointing to the third memory space, and a buffer descriptor pointer pointing to the second memory space; and storing a first buffer descriptor to the second memory space such that the second pointer points to the first buffer descriptor, the first buffer descriptor including a next buffer descriptor pointer pointing to the fourth memory space, and a buffer pointer pointing to a first buffer memory space, wherein at least a first portion of the data field of the first packet is stored in the first buffer memory space.

According to another aspect of the invention, a method is provided for de-queuing one or more data packets queued for transmission in a data structure for a virtual connection (VC) in a networking system device, wherein each data packet has a data field. The data structure typically includes a packet descriptor associated with each of the packets, and one or more buffer descriptors associated with each of the packets, wherein each buffer descriptor includes a buffer pointer pointing to a buffer memory. The method typically comprises the steps of reading a next packet descriptor pointer in a VC queue descriptor associated with a first VC to determine the memory location of a first packet descriptor associated with a first packet to be de-queued, wherein the next packet descriptor pointer has a value indicating the memory location of the first packet descriptor; reading the first packet descriptor, wherein the first packet descriptor includes a first buffer descriptor pointer having a value indicating the memory location of a first buffer descriptor associated with the first packet; reading the first buffer descriptor to determine the memory location of a first buffer memory to be de-queued, wherein the first buffer descriptor includes a first buffer pointer having a value indicating the location of the first buffer memory; and de-queuing the data stored in the first buffer memory.

According to yet another aspect of the present invention, a network processor in a networking accelerator system is provided, wherein the network processor is communicably coupled to one or more networks. The network processor typically comprises an internal memory, and processing logic for implementing a two-dimensional queuing and de-queuing method for queuing and de-queuing packets for transmission in a two-dimensional link list data structure for one or more Virtual Connections (VCs). The network processor is preferably integrated on a single chip, but may be integrated on many chips.

According to a further aspect of the invention, a method is provided for implementing a two-dimensional link list data structure for use in queuing and de-queuing packets for transmission for one or more Virtual Connections (VCs) in a network processor communicably coupled to one or more networks, wherein the network processor has an internal memory. The network processor is preferably integrated on a single chip, but may be integrated on many chips. The method typically comprises the steps of: building the two-dimensional link list data structure for the one or more VCs, wherein the data structure includes a first list linking one or more buffer descriptors on a per-packet basis, and a second list linking one or more packet descriptors on a per-VC basis; and storing at least a portion of the data structure to the internal memory.

According to yet a further aspect of the invention, a method is provided in a networking system device for queuing one or more data packets for transmission for a virtual connection (VC), wherein each of the data packets has a data field. The method typically comprises the steps of creating a VC queue descriptor associated with a first VC, wherein the VC queue descriptor typically includes a first pointer pointing to a first memory space; a second pointer pointing to a second memory space; a third pointer pointing to a third memory space; and a fourth pointer pointing to a fourth memory space. Each of the first, second, third and fourth pointers has a value indicating the location of an associated memory space. The method also typically includes the step of storing a first packet descriptor associated with a first one of the packets to the first memory space such that the first pointer points to the first packet descriptor, wherein the first packet descriptor includes a next packet descriptor pointer pointing to the third memory space, and a buffer pointer pointing to a first buffer memory space, wherein the entire data field of the first packet is stored in the first buffer memory space.

According to an additional aspect of the invention, a method is provided in a network device for de-queuing one or more data packets queued for transmission in a data structure for a virtual connection (VC). Each data packet has a data field, and the data structure includes a packet descriptor associated with each of the packets, and one or more buffer memories associated with each of the packets. Each of the packets has one or more associated buffer descriptors only if more than one buffer memory is associated with the packet, and each buffer descriptor includes a buffer pointer pointing to one of the buffer memories. The method typically comprises the step of reading a next packet descriptor pointer in a VC queue descriptor associated with a first VC to determine the memory location of a first packet descriptor associated with a first packet to be dequeued, wherein the next packet descriptor pointer has a value indicating the memory location of the first packet descriptor. The method also typically includes the steps of reading the first packet descriptor, wherein the first packet descriptor includes a flag indicating that only one buffer memory is associated with the first packet, and a first buffer pointer having a value indicating the location of a first one of the buffer memories; and de-queuing the data stored in the first buffer memory.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
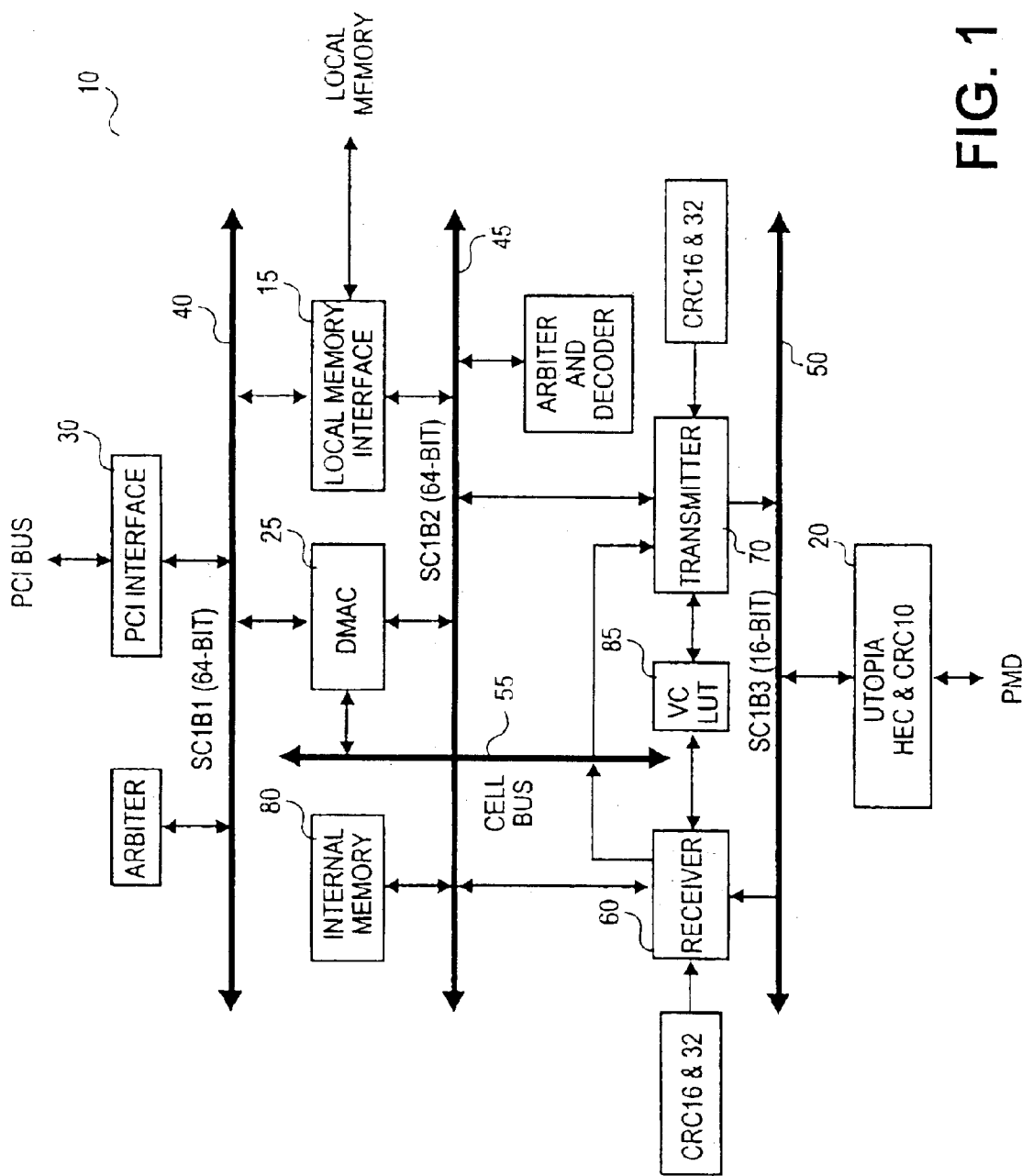
FIG. 1 is a block diagram of the architecture of a processing engine according to an embodiment of the present invention.

FIG. 1 is a block diagram of the architecture of a network processing engine 10 according to an embodiment of the present invention. In preferred aspects, the network processing engine of the present invention is useful for a variety of applications including implementation in multi-protocol network interface cards (NICs), server NICs, workgroup, IP and ATM switches, multi-protocol and IP routers, ATM backbone switch applications, multi-protocol/ATM adapters and the like. In preferred aspects, all components of processing engine 10 reside on a single chip (e.g., a single silicon chip), but all components may be spread across many chips such that processing engine 10 is implemented using many chips.

Processing engine 10 includes a local memory interface block 15, UTOPIA interface 20, Direct Memory Access Controller (DMAC) 25, PCI interface 30, first internal bus 40, second internal bus 45, third internal bus 50, and cell bus 55. Processing engine 10 also includes a receiver block 60 and a transmitter block 70 for processing incoming and outgoing data transmissions, respectively, and an internal memory 80. Local memory interface block 15 provides a connection to a local (off-chip) memory, such as DRAM, SRAM, SDRAM, SSRAM or any combination thereof. DMAC 25 provides control of data transfers between external memories (PCI), internal memory 80 and the local memory.

PCI interface 30 provides a connection to external intelligence, such as a host computer system, and external packet memories. First and second internal buses 40 and 45 in one embodiment are non-multiplexed 32 bit address and 64 bit data buses. Depending on the desired line rate, PCI interface 30 can be configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 20 supports connections to a broad range of layer 1 physical interfaces. To support a 622 Mbps line rate, the UTOPIA data bus is 16 bits, whereas for a 155 Mbps line rate the UTOPIA bus is 8 bits. Third internal data bus 50 is an 8 or 16 bit UTOPIA compatible interface. Cell bus 55 is a 64 bit data path and is used to transfer cells or frames between internal cell/frame buffers of receiver block 60 and transmitter block 70 and the PCI memory space through DMAC 25. Cell bus 55 allows several transactions to occur in parallel. For example, data payload transfers and descriptor data movement may occur simultaneously. Additionally, for a 622 Mbps line rate, cell bus 55 is capable of off-loading up to 160 MBps of bandwidth from local memory.

Generally, receiver block 60 reassembles incoming cells or frames into packets. In asynchronous Transfer Mode (ATM) networking systems, data traffic is handled by a Virtual Connection (VC). There are typically many VCs in each system and each VC has its own characteristics, such as packet types, sizes and protocols. Therefore, each VC requires its own descriptor that identifies the VC and its characteristics and requirements. For each VC, receiver block 60 creates a VC descriptor address and fetches the VC descriptor. VC look-up module 85 includes a look-up table that is used to translate the descriptor pointer addresses for VCs that have been registered in the internal cache memory 80. Transmitter block 70 is responsible for creating a data structure for each VC and queuing the data structures within the internal RAM for DMA transfer. In preferred embodiments, a two-dimensional link list is created and implemented for optimal queuing and de-queuing of packets reassembled by the receiver block as will be described in more detail below. Generally, one list links buffer descriptors on a per-packet basis and the other list links packet descriptors, ready for transmission, on a per-VC basis. Implementation of the two-dimensional link list data structure as described herein dramatically improves memory utilization and overall system performance as only one look-up is needed for each VC. Transmitter block 70 is also responsible for dequeueing the data structures for each VC as well as scheduling and shaping the data traffic. Furthermore, transmitter block 70 is capable of accepting data packets and transmitting the data using PPP or Frame Relay encapsulation into the SONET interface.

A VC typically requires up to 64 bytes of descriptor, pointer, bit map and other relevant information. The number of bytes required depends on the service category and whether it is a transmit or receive channel. To support 1024 VCs, approximately 64 Kbytes of local memory is required for the associated VC descriptors. Processing engine 10 supports up to 64,000 (64K) VC's in one embodiment. In this embodiment, internal memory 80 registers up to 128 VC's. For applications requiring more than 128 VCs, local memory is required to store additional VC descriptors. Thus, for applications requiring small numbers of VCs, the use of local memory to store VC descriptors is not needed and can be eliminated if desired.

Receiver block 60 reassembles incoming cells or frames into packets. In one embodiment, receiver block 60 operates in an ATM termination mode wherein cells are reassembled into packets. In another embodiment, receiver block 60 operates in a Router Interface mode where frames are reassembled into packets. In the ATM termination mode of operation, for example, upon cell arrival receiver block 60 extracts the cell header and passes the cell payload to either an internal cell buffer or local memory. Receiver block 60 forms the VC descriptor address from the VCI/VPI field within the cell header. After the VC descriptor address has been formed, the VC descriptor is fetched by receiver block 60. In one embodiment, the VC descriptor is stored in an internal memory cache, such as internal memory 80. This embodiment is useful for delay sensitive and high bandwidth applications. In an alternate embodiment, the VC descriptor is stored in local memory. In either case, when a transmission from the CPU or the PCI space is to take place, transmitter block 70 fetches the VC descriptor and creates a data structure which is queued for DMA transfer. In preferred aspects, the data structure is a two-dimensional link list as will be described below. Also, the data structure is preferably queued in internal memory 80. Transmitter block 70 de-queues the data structure and transmits the payload to the desired destination as provided in the addressing information provided in the header.

Figure 2:
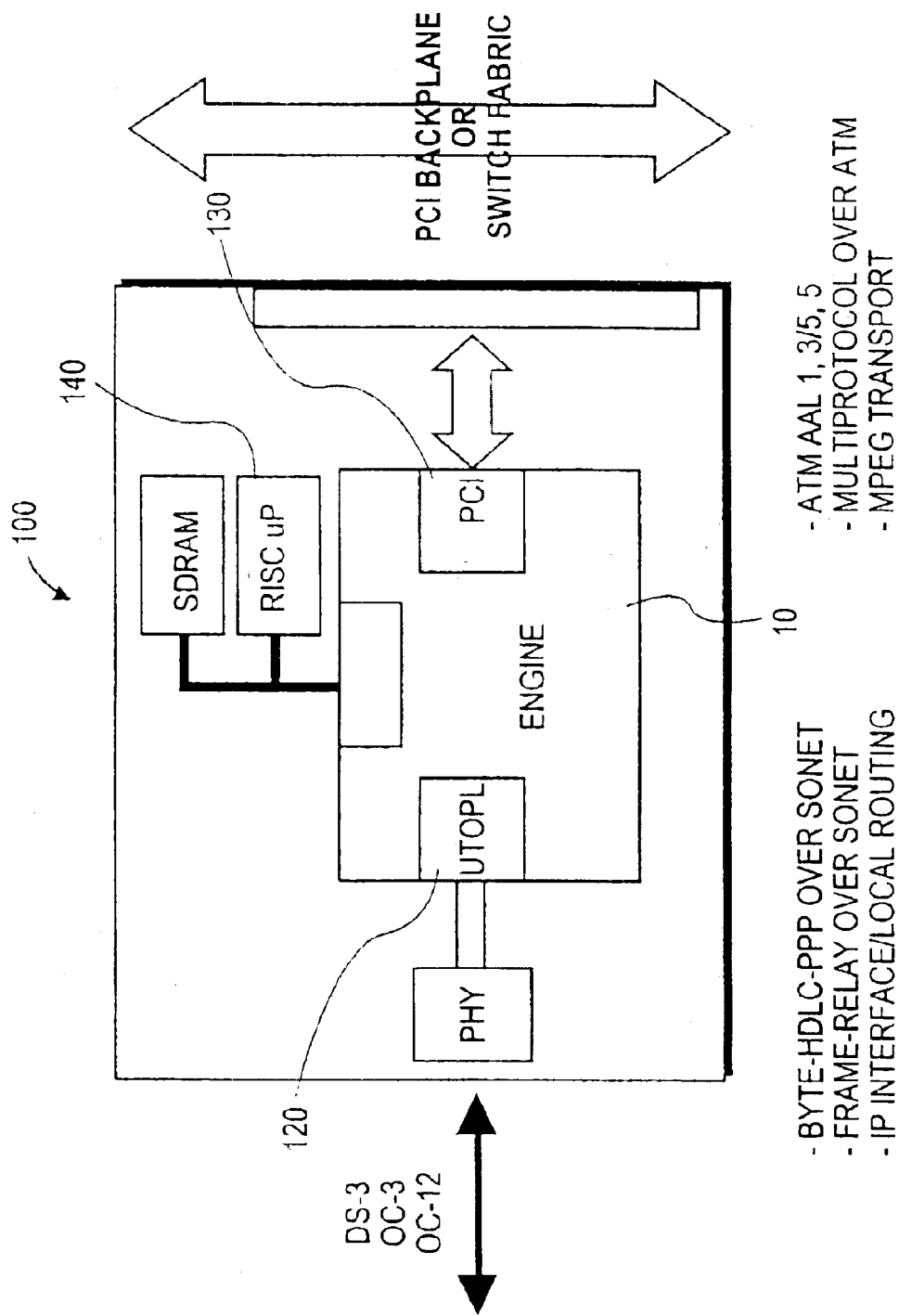
FIG. 2 depicts a block diagram of the general system architecture of a network processing engine implemented in a multi-protocol network interface according to an embodiment of the present invention.

FIG. 2 depicts a block diagram of the general system architecture of a multi-protocol network interface 100 including a network processing engine 10 according to an embodiment of the present invention. Network processing engine 10 of network interface 100 includes a UTOPIA interface 120 for direct coupling to a broad range of layer 1 physical interfaces, including, for example, OC-1, OC-3, OC-12, OC-48 and DS-3 interfaces. PCI interface 130 provides a host-side interface to a host computer system and host memory. Microprocessor 140 provides local control and management of the functionality of network interface 100. Microprocessor 140 performs many control functions including network statistical and management functions, TCP/IP over ATM functions, and ATM service specific software functions. Network processing engine 10, with the help of microprocessor 140, allows for off-loading of functions typically performed by the host system's main processor by integrating relevant layer 2 functions and providing extensive hardware assist/acceleration for CPU (host system) resident layer 3 functions for a variety of high speed network protocols, such as TCP/IP, packet-over-SONET, byte level HDLC in PPP, ATM and byte level Frame Relay.

Figure 3:
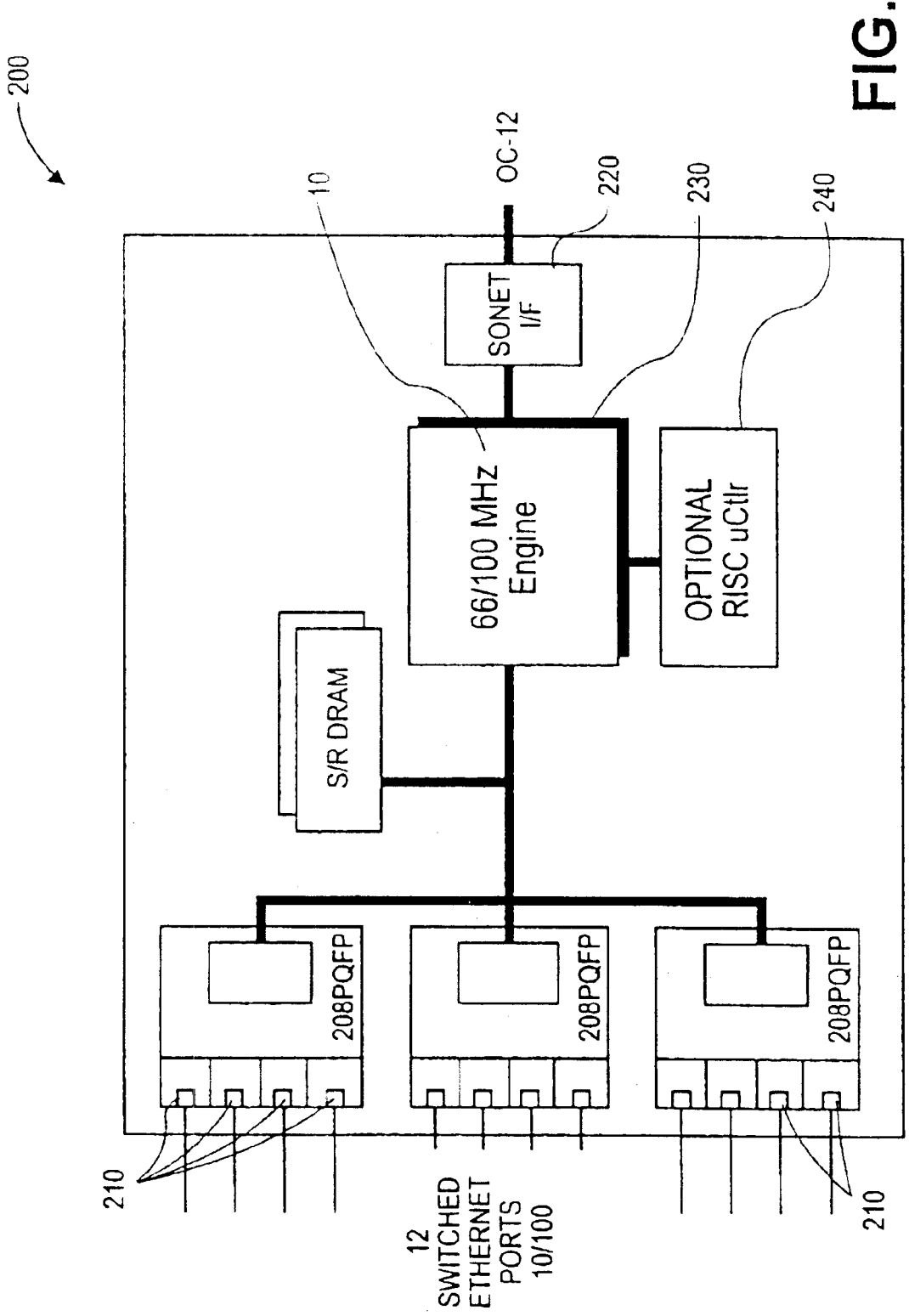
FIG. 3 illustrates a simplified block diagram of the system architecture of a processing engine implemented in a 10/100 Ethernet to ATM workgroup switch according to an embodiment of the present invention.

FIG. 3 illustrates a simplified block diagram of the system architecture of a 10/100 Ethernet to ATM workgroup switch 200 including processing engine 10 according to an embodiment of the present invention. Switch 200 includes multiple switched Ethernet ports 210, SONET interface 220, processing engine 10 and local microprocessor 240. As Ethernet packets arrive over one or more of the Ethernet ports 210, local microprocessor 240, in conjunction with processing engine 10, processes the header information and routes the packets based on the addressing information. In one embodiment, these routed packets are segmented into and reassembled from AAL-5 ATM format and transmitted through SONET interface 220 at OC-12 rate, or routed back into one of ethernet ports 210. Full ABR support and traffic shaping is provided into the network in ATM mode. The OC-12 interface can also be configured to support packet-over-SONET or MPOA for IP ready networks. Also, this configuration can be used to support an OC-3 capable version.

Implementation of the two-dimensional link list according to the present invention will now be described. Each VC is represented by a VC descriptor (VC Queue descriptor) that includes pointers to packet descriptors and buffer descriptors. Packet descriptors include information about a packet, a pointer to another packet descriptor address, and a pointer to a buffer descriptor address. Buffer descriptors include buffer information such as an address in memory where data for a particular packet is stored, and a pointer to another buffer descriptor address. In the present invention, data for a particular packet does not need to be stored in a single buffer. Thus, for data payloads that are larger than an individual buffer, the payload is stored in multiple buffers. In this multiple buffer case, each buffer descriptor includes a pointer to the next buffer descriptor associated with the next buffer that stores data for that particular packet. When a packet is stored in multiple buffers, the buffers need not be contiguous. For example, in one embodiment, the buffers for a particular data packet are non-contiguous memory locations in the same memory (e.g., internal memory 80, or the local memory). In another embodiment, the buffers for a particular packet reside in different memories, such as a combination of the local memory and internal memory 80.

In an alternate embodiment, when data for a particular packet can be stored in a single buffer, the packet descriptor does not include a pointer to a buffer descriptor address. Rather, in this embodiment, the packet descriptor includes a flag indicating that the packet is a single buffer packet, and an address indicating where in memory the data for the (single buffer) packet is stored. When the flag is read, the data in the memory location identified by the address will be accessed. In this embodiment, a buffer descriptor is not needed for the (single buffer) packet because the packet descriptor is of sufficient size to include the buffer address and other necessary information about the buffer, such as buffer size.

Figure 4:
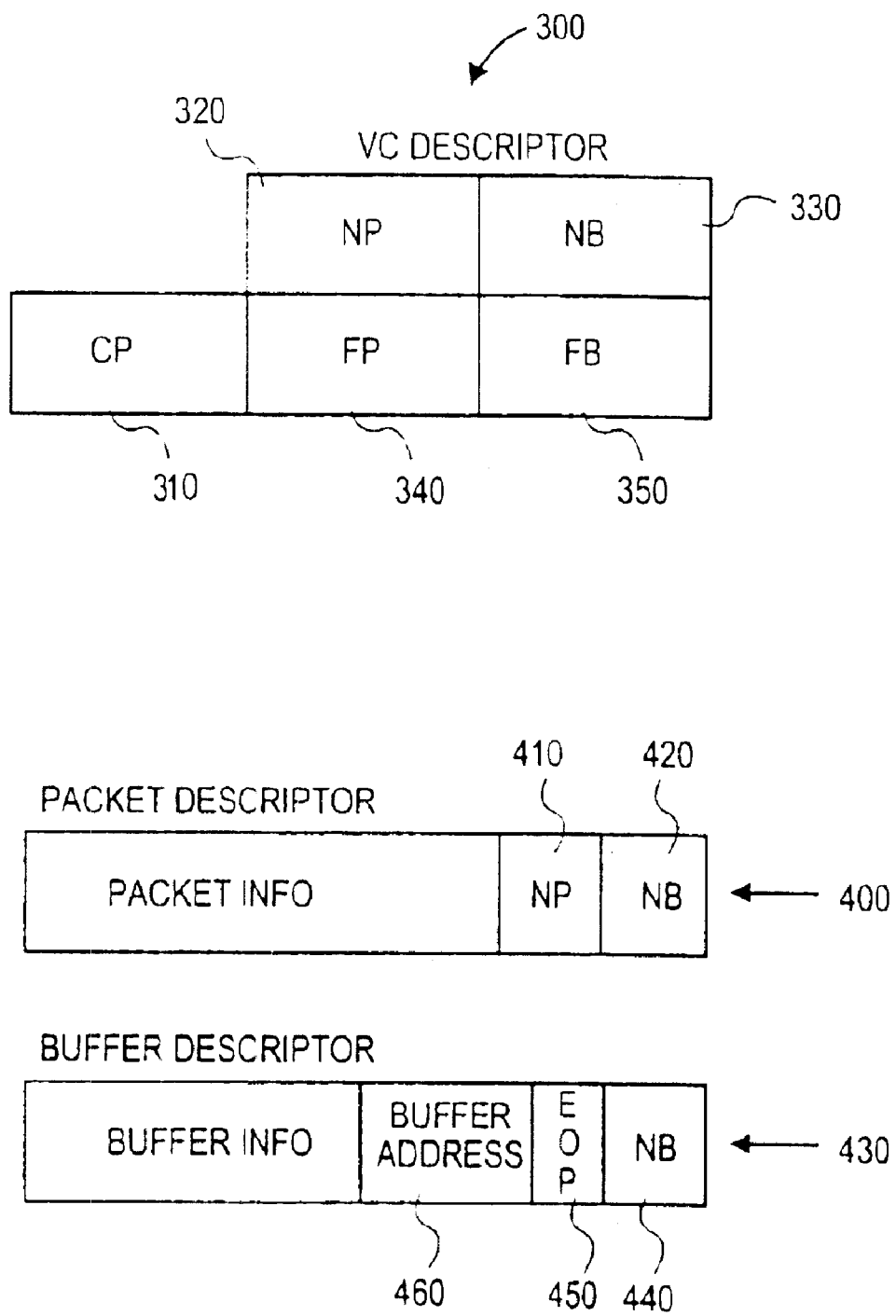
FIG. 4 illustrates block diagram of a Virtual Channel (VC) descriptor, a packet descriptor and a buffer descriptor according to the present invention.

FIG. 4 illustrates block diagram of a VC descriptor 300, a packet descriptor 400 and a buffer descriptor 430 according to the present invention. According to one embodiment, the VC descriptors-physically reside in internal memory such as memory 80, and the packet descriptors and buffer descriptors physically reside in the SDRAM or SSRAM memory of the local memory.

In general, five pointers are used to create each two-dimensional link list for the first packet in a VC when a VC is newly opened. That is, five pointers are typically needed to represent each VC descriptor link structure according to the present invention. When the first packet is to be queued, a link builder state machine in Transmitter block 70 fetches pointers from a free link pointer pool. In FIG. 4, Current packet descriptor pointer (CP) 310 points to the packet descriptor being built. As shown in FIG. 4, VC descriptor 300 includes four other pointers for the first packet. Next packet descriptor pointer (NP) 320 points to the next packet descriptor address in the buffer descriptor about to be de-queued. Next buffer descriptor pointer (NB) 330 points to the next buffer descriptor address in the buffer descriptor about to be de-queued. Future packet descriptor pointer (FP) 340 points to the next packet descriptor address field in the packet descriptor of the current packet being queued. Future buffer descriptor pointer (FB) 350 points to the next buffer descriptor address field in the buffer descriptor. Using these pointers and the information in packet add registers, the engine builds the packet descriptor, the buffer descriptors and their two dimensional link structure using pointers obtained from a free link pointer pool.

As shown in FIG. 4, packet descriptor 400 includes next packet descriptor pointer (NP) 410, next buffer descriptor pointer (NB) 420 and a packet information field including various information about the packet such as packet length, packet format type (e.g., ATM, MPOA, LANE, AAL, etc.), and LLC/SNAP encapsulation type. NP 410 points to the next packet descriptor queued for the particular VC. If this is the last packet, NP 410 points to the same memory location as FP 340 of VC descriptor 300. NB 420 points to the next buffer descriptor, which is the first buffer descriptor for the packet. Buffer descriptor 430 includes next buffer descriptor pointer (NB) 440, end of packet (EOP) bit 450, buffer address 460 and a buffer information field including various information about the buffer such as whether the buffer is in PCI or local bus address space, and buffer size (e.g., 256, 512, 1024, or 2048 bytes). NB 440 points to the next buffer descriptor queued for the same packet. When queuing, if this is the last buffer in the packet and EOP bit 450 is not set (not end of packet), NB 440 points to the same address space to which FB 350 of the associated VC descriptor 300 is pointing. NB 440 is "don't care" when EOP bit 450 is set. That is, NB 440 is irrelevant because it is not read when EOP bit 450 is set.

Figure 5:
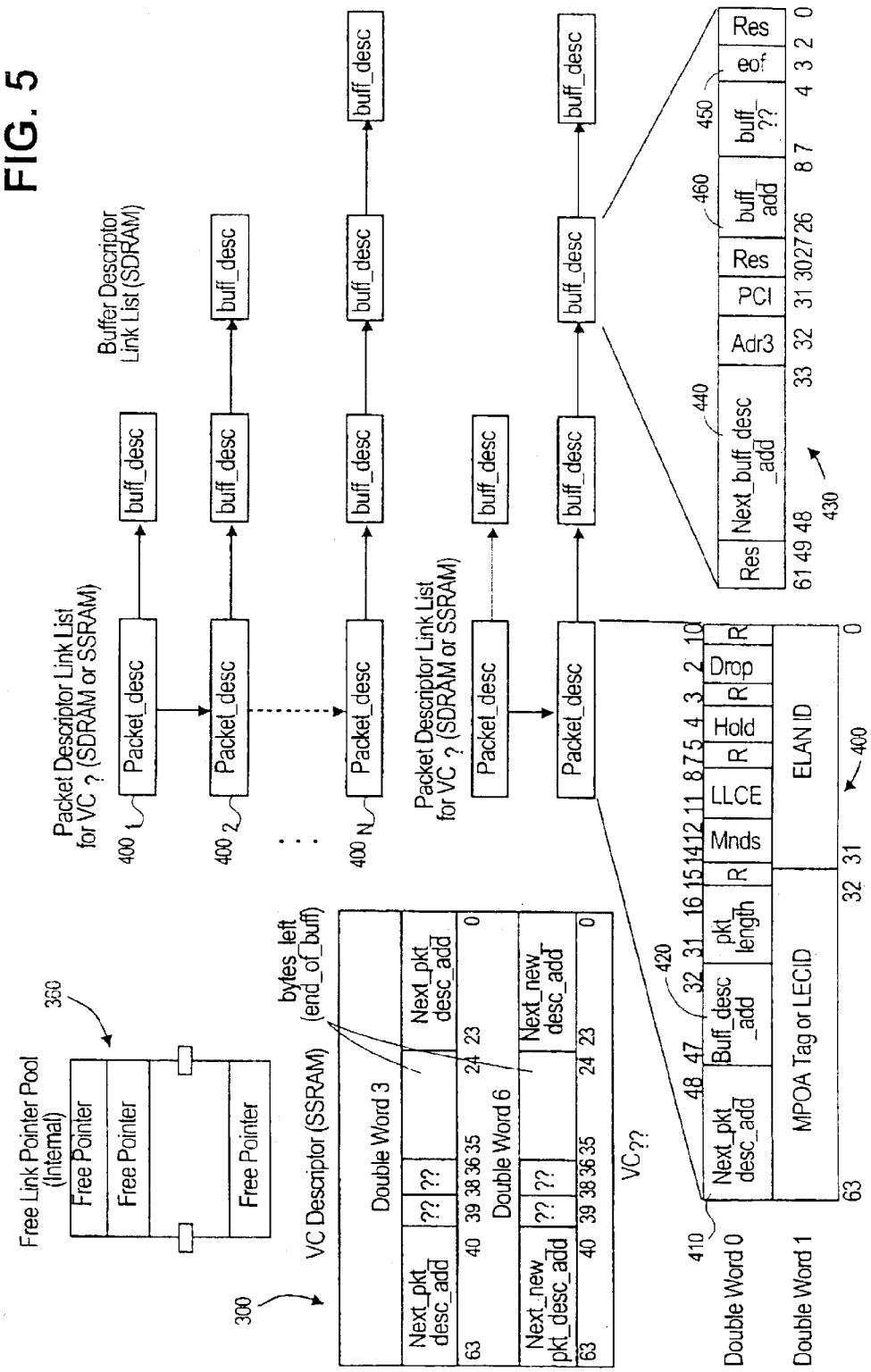
FIG. 5 illustrates an example of two two-dimensional link list data structures of two VCs ($VC_x$ and $VC_y$) according to an embodiment of the present invention.

FIG. 5 illustrates an example of two two-dimensional link list data structures for two VCs (VCx and VCy) according to an embodiment of the present invention. Each VC is linked to one or more packet descriptors and each packet descriptor is linked to one or more buffer descriptors. As shown in FIG. 5, the two-dimensional link list data structure for VCx includes N packet descriptors $400_1$ to $40_N$. For VCy, the data structure includes two packet descriptors. Each packet descriptor is linked to one or more buffer descriptors, depending on the size of the various packets. Also shown is free link pointer pool 360. The link builder state machine fetches pointers from free link pointer pool 360 to add more packet descriptors to the packet descriptor link list or to add more buffer descriptors to the buffer descriptor link list. When a packet belonging to a particular packet descriptor completes its transmission phase, the pointers used to link the packet descriptor and the associated buffer descriptors are returned by the descriptor processor state machine into free link pointer pool 360.

Figure 6:
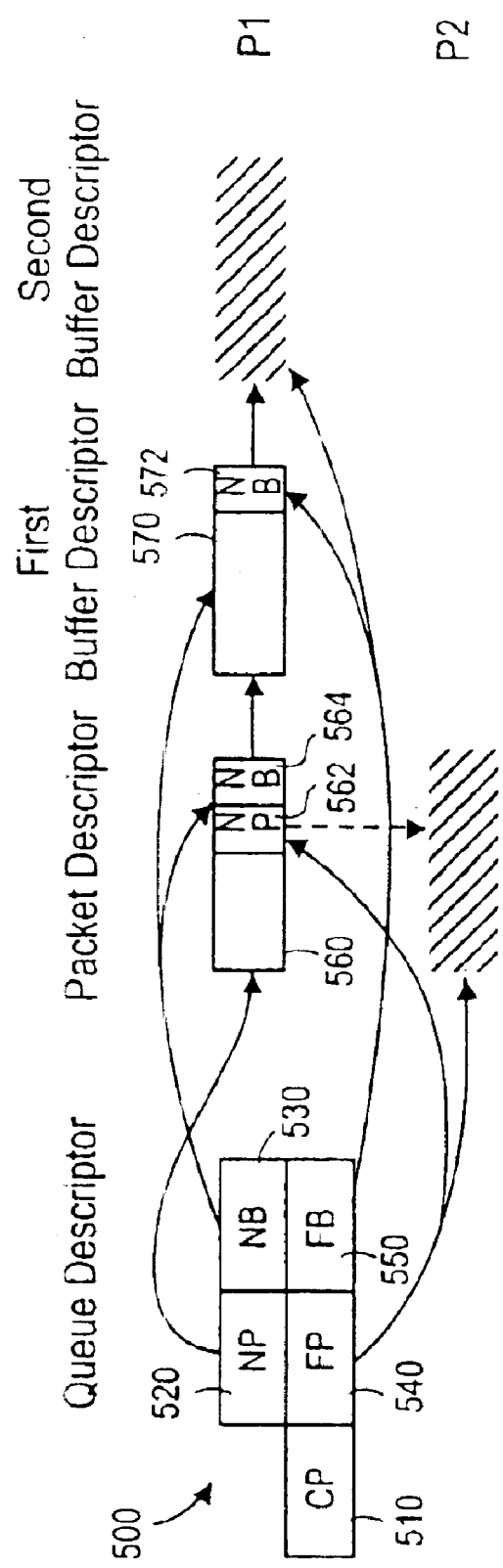
FIGS. 6–8 illustrate an example of queuing 2 packets into a two-dimensional link list for transmission for a particular VC according to an embodiment of the present invention.
Figure 7:
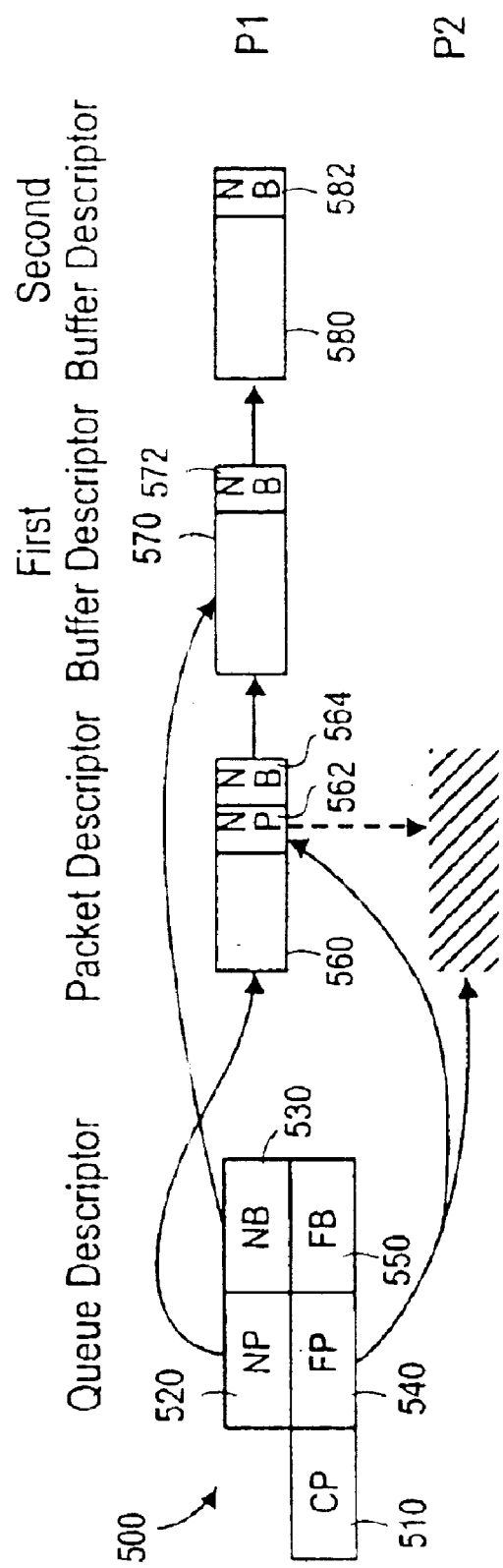
Figure 8:
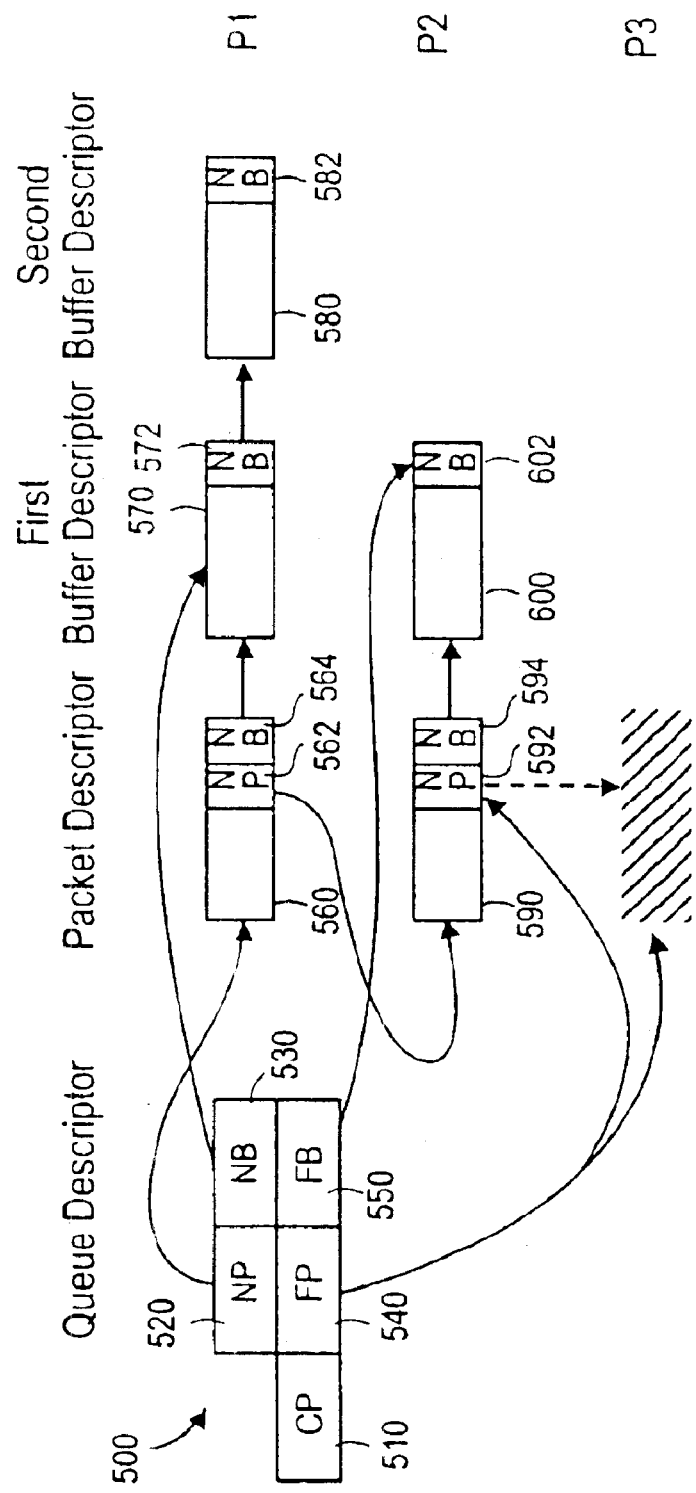

FIGS. 6–8 illustrate an example of queuing 2 packets into a two-dimensional link list for transmission for a particular VC according to the present invention. FIG. 6 illustrates the state of the data structure after the first buffer of the first packet has been queued. Pointers were first fetched to create VC descriptor 500. (To avoid confusion with pointers in the packet descriptors and buffer descriptors, the NP, NB, FP and FB pointers of a VC descriptor will hereinafter be denoted as VCNP, VCNB, VCFP and VCFB, respectively.) Initially, VCNP 520 pointed to a memory space where the first packet descriptor was to be written. Likewise, VCNB 530 initially pointed to a memory space where the first buffer descriptor was to be written. Thus, packet descriptor 560 was written to the memory space pointed to by VCNP 520, and first buffer descriptor 570 of packet P1 was written to the memory space pointed to by VCNB 530. One purpose of VCNP 520 is to point to the next packet to be served for transmission (de-queued) for that particular VC. In preferred aspects, packets are de-queued for each VC in the same order that they are queued (i.e., FIFO). Thus, VCNP 520 points to packet descriptor 560 until dequeueing commences for that particular VC. Similarly, VCNB 530 points to first buffer descriptor 570 until the dequeueing process commences. The value of VCNB 530 is copied to NB 564 of packet descriptor 560, such that NB 564 also points to first buffer descriptor 570. CP 510 is pointing to packet descriptor 560.

VCFP 540 of FIG. 6 points to a memory address where the next packet descriptor to be queued will be stored. In this particular example, VCFP 540 points to the memory address where the packet descriptor for the second packet P2 is to be stored. The value of VCFP 540 is copied to NP 562 of packet descriptor 560. That is, NP 562 points to the memory address where the next packet descriptor is to be stored VCFB 550 points to a memory address where the next buffer descriptor to be queued is to be stored, whether it be for the first packet or for a second packet. In this particular example, as shown VCFB 550 points to the memory address where the second buffer descriptor for the first packet P1 is to be stored. The value of VCFB 550 is copied to NB 572 of buffer descriptor 570. That is, NB 572 also points to the memory address where the second buffer descriptor is to be stored.

FIG. 7 illustrates the process of queuing the second buffer of the first packet. In this example, second buffer descriptor 580 is written to the memory location pointed to by VCFB 550 (which is the same as NB 572 of first buffer descriptor 570). Because, in this example, all the data for the first packet P1 can be stored into the first and second buffers, the EOP bit of second buffer descriptor 580 is set. NB 582 is therefore "don't care". At this point, the entire payload of the first packet has been buffered and the associated link list has been queued for transmission. VCNP 520 and VCNB 530 remain pointing to packet descriptor 560 and buffer descriptor 570, respectively, until de-queuing commences. VCFB 550 is updated (new pointer fetched) to point to a new buffer descriptor address for storing the next buffer descriptor (not shown in FIG. 7) when it is determined that another buffer is required for storing data.

FIG. 8 illustrates the process of queuing the first (also the only) buffer of the second packet P2. As shown, packet descriptor 590 has been written to the memory address previously pointed to by VCFP 540, and VCFP 540 has been updated to point to a memory address where the next packet descriptor to be queued will be stored. The new value of VCFP 540 is also copied to NP 592 of packet descriptor 590. That is, NP 592 points to the memory address where the next packet descriptor is to be stored. First, a pointer is fetched for VCFB 550, and buffer descriptor 600 of second packet P2 is written to the memory address pointed to by VCFB 550, which in FIG. 7 was not shown. VCFB 550 is updated to point to a new buffer descriptor address for storing the next buffer descriptor when a new buffer is required. This value is copied to NB 602 of buffer descriptor 600. However, since this is the last buffer for the second packet P2, the EOP bit of buffer descriptor 600 will be set and NB 602 will be "don't care". CP 510 is updated to point to packet descriptor 590.

Figure 9:
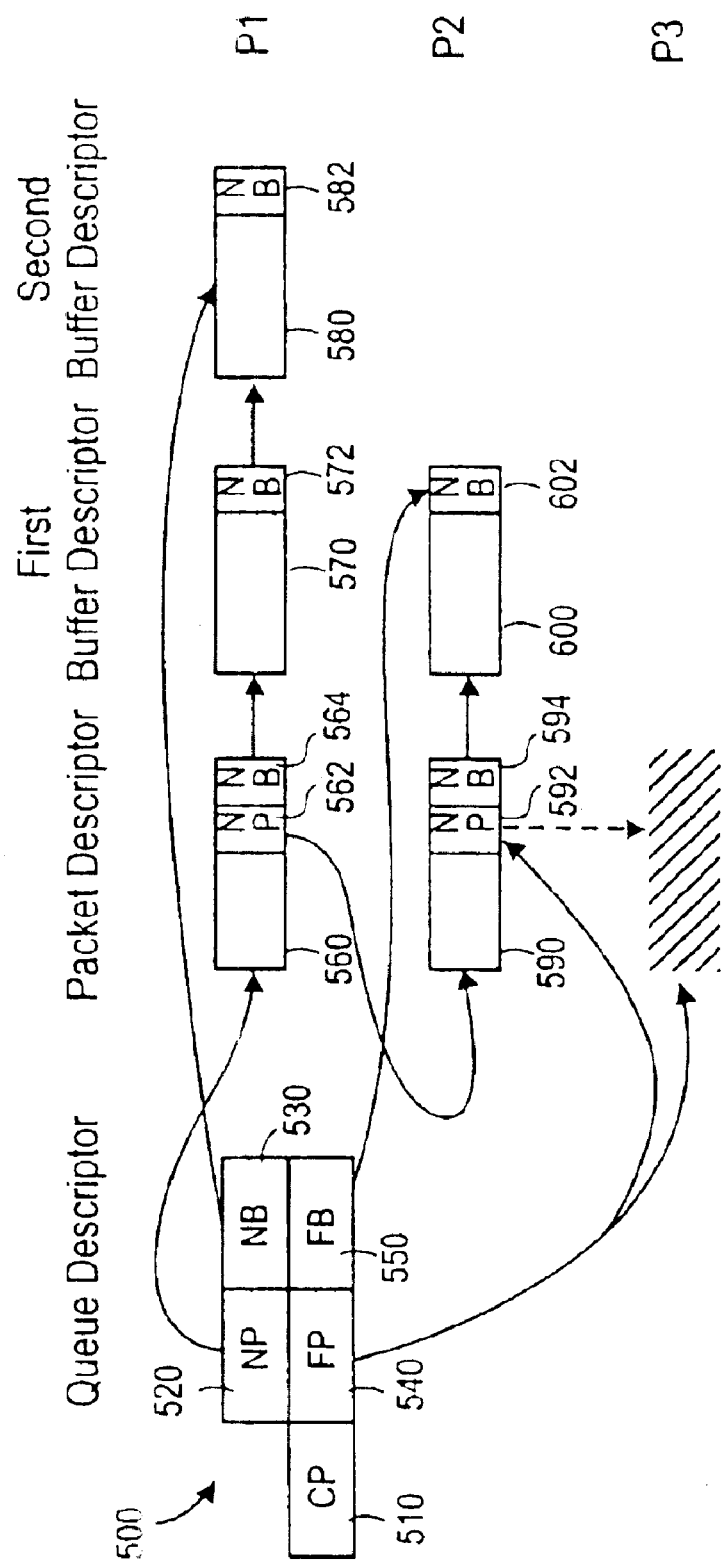
FIGS. 9–12 illustrate an example of the 2 packets of FIGS. 6–8 being de-queued for transmission according to an embodiment of the present invention.

FIGS. 9–12 illustrate an example of the 2 packets of FIGS. 6–8 being de-queued for transmission according to the present invention. FIG. 9 illustrates the process of de-queuing the first buffer of the first packet P1. Initially, VCNP 520 is read to determine which packet is to be de-queued. In preferred aspects, packets are de-queued for a particular VC in the same order that they are queued (i.e., FIFO). In this case, VCNP 520 pointed to packet descriptor 560. Therefore packet descriptor 560 is accessed and NP 562 is written to VCNP 520 so that VCNP 520 now points to the next packet descriptor to be de-queued, namely packet descriptor 590 of packet P2. NB 564 is read to determine the next buffer descriptor to be de-queued. In this case, NB 564 points to first buffer descriptor 570. First buffer descriptor 570 is dequeued, and the data stored in the associated buffer is served for transmission. Additionally, the value of NB 572 is copied to VCNB 530, so that VCNB 530 now points to second buffer descriptor 580 of packet P1. In this manner, updating VC descriptor 500 during the de-queuing process allows the system to keep track of which packets and buffers have been de-queued, and therefore which packets and buffers are next in line for transmission for each VC. The pointers pointing to packet descriptor 560 and first buffer descriptor 570 are returned to the free link pointer pool. VCFP 540 still points to a free memory space at this time.

Figure 10:
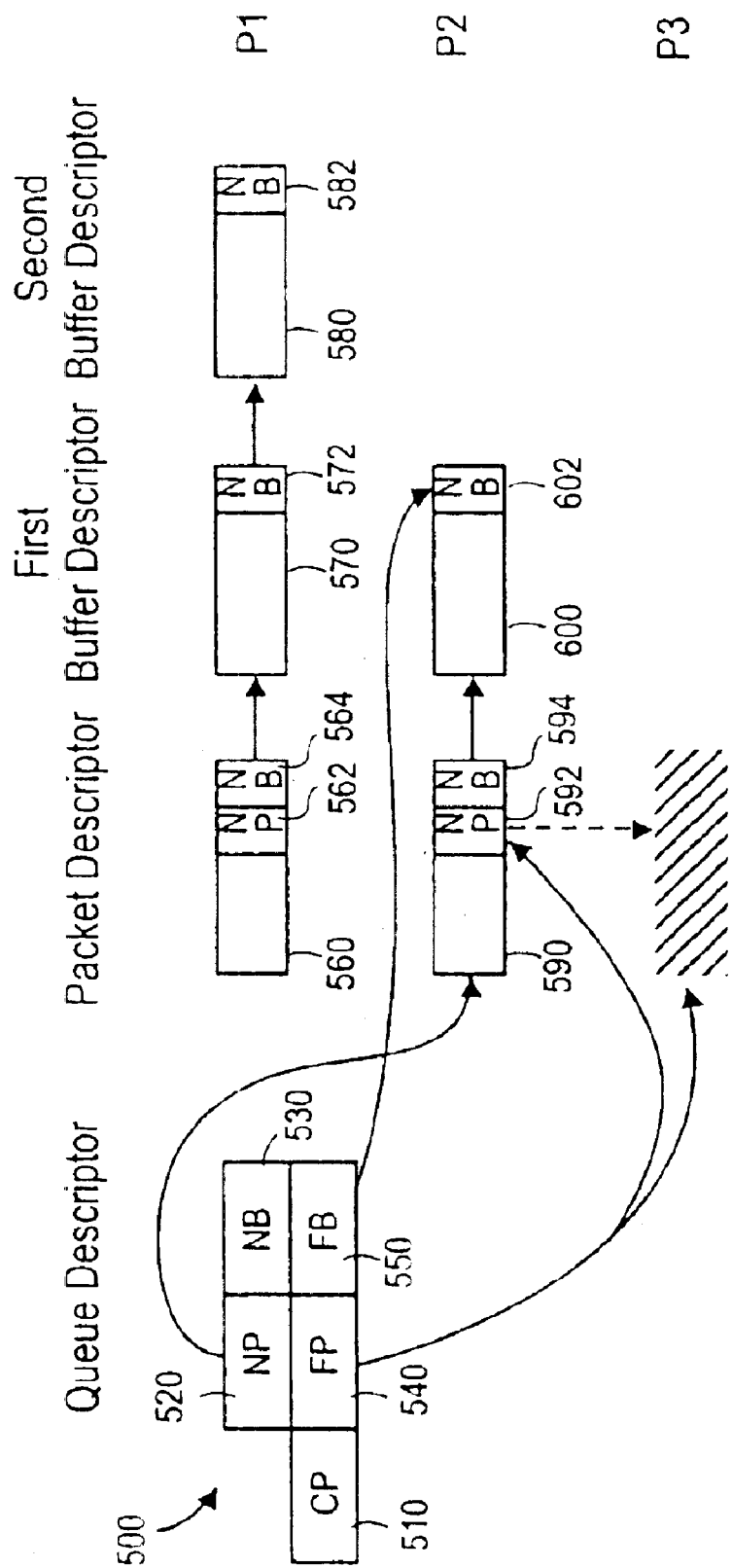

FIG. 10 illustrates the process of de-queuing the second buffer of the first packet P1. As the EOP bit of first buffer descriptor 570 was not set, NB 572 is read to determine the next buffer descriptor address for dequeueing, namely second buffer descriptor 580. Second buffer descriptor 580 is dequeued, and the data stored in the associated buffer is served for transmission. As the EOP bit of second buffer descriptor 580 is set, NB 582 is "don't care", and the next packet (packet descriptor) to be de-queued is determined. The pointer pointing to second buffer descriptor 580 is returned to the free link pointer pool.

Figure 11:
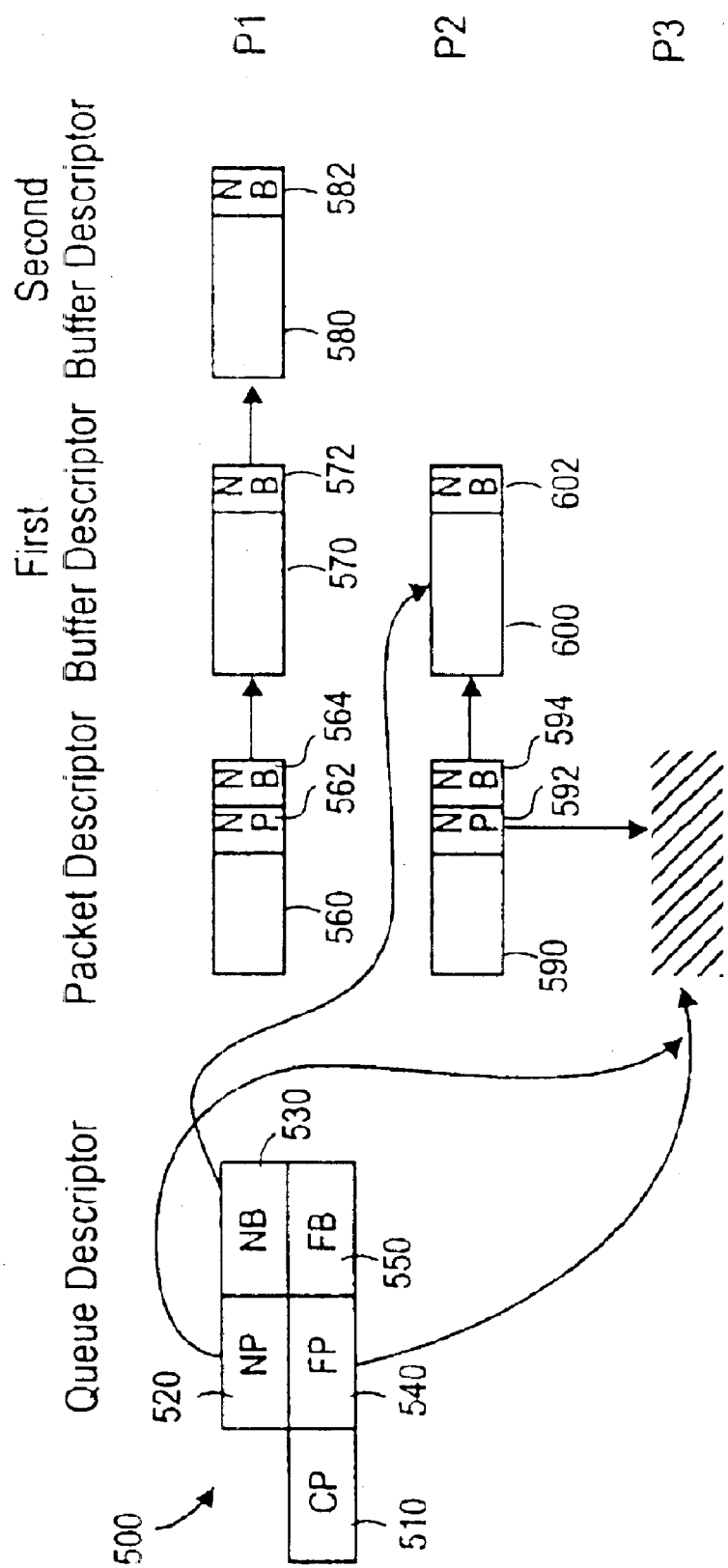
Figure 12:
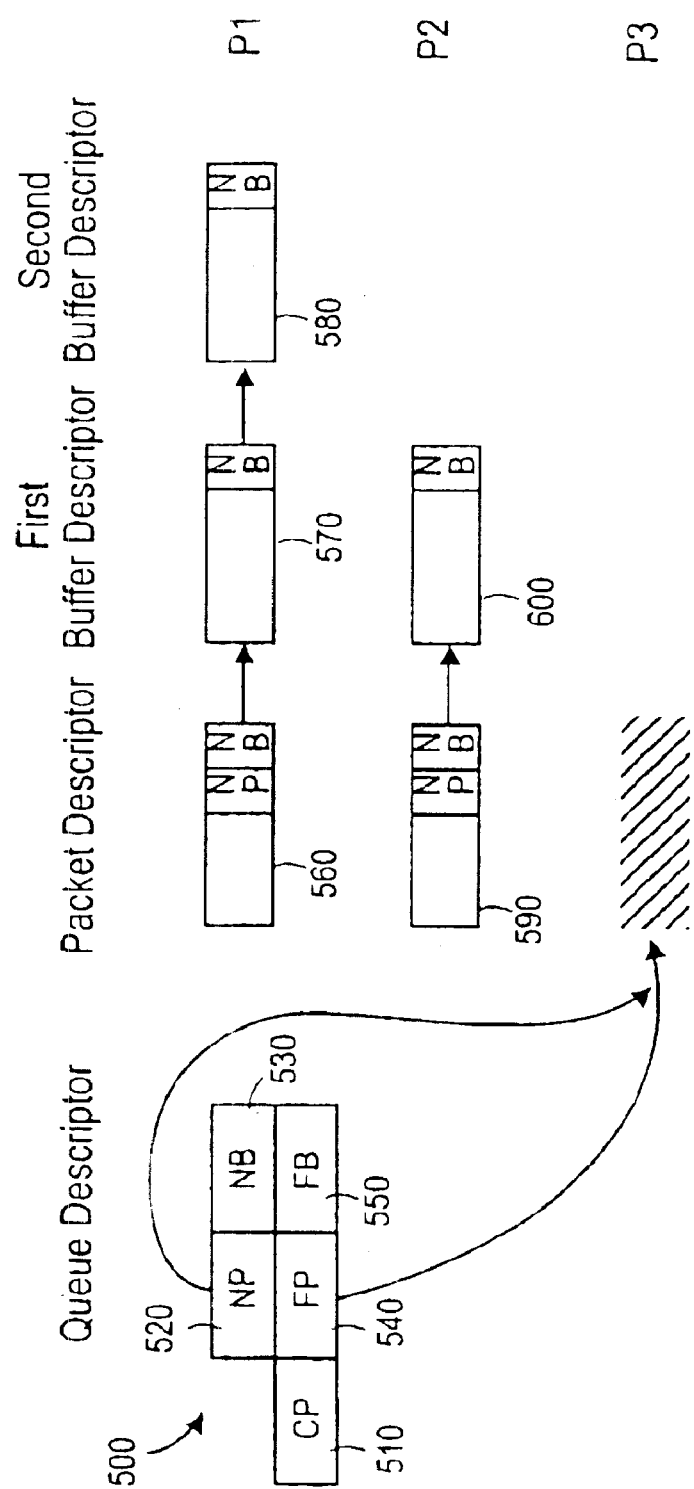

FIG. 11 illustrates the process of de-queuing the first buffer of the second packet P2. VCNP 520 is read to determine which packet is to be de-queued. In this case, VCNP 520 points to packet descriptor 590 of packet P2. Therefore packet descriptor 590 is accessed and NP 592 is written to VCNP 520 so that VCNP 520 now points to the next packet descriptor to be de-queued. In this case, there is no additional packet to be de-queued, so VCNP 520 points to the same memory space as VCFP 540 (i.e., VCNP=VCFP). Additionally, the value of NB 594 is copied to VCNB 530 so that VCNB 530 points to buffer descriptor 600. NB 594 is subsequently read to determine the next buffer descriptor for de-queuing, namely buffer descriptor 600. Buffer descriptor 600 is dequeued, and the data stored in the associated buffer is served for transmission. As the EOP bit of buffer descriptor 600 is set, NB 602 is "don't care", and the next packet to be dequeued is determined. The pointers pointing to packet descriptor 590 and buffer descriptor 600 are returned to the free link pointer pool. FIG. 12 illustrates the state after all packets have been de-queued for the examples illustrated in FIGS. 6–11. At this point there are no queued packet descriptors. That is, both VCNP 520 and VCFP 540 are pointing to the same memory space (i.e., VCNP=VCFP).

Generally, a packet is ready to be de-queued for transmission when both VCFP:VCNP and CP#VCNP. Also, a packet is available for transmission when both CP=VCNP and a packet ready bit ($pkt_{13}$ rdy) in VC 500 is set.

Figure 13:
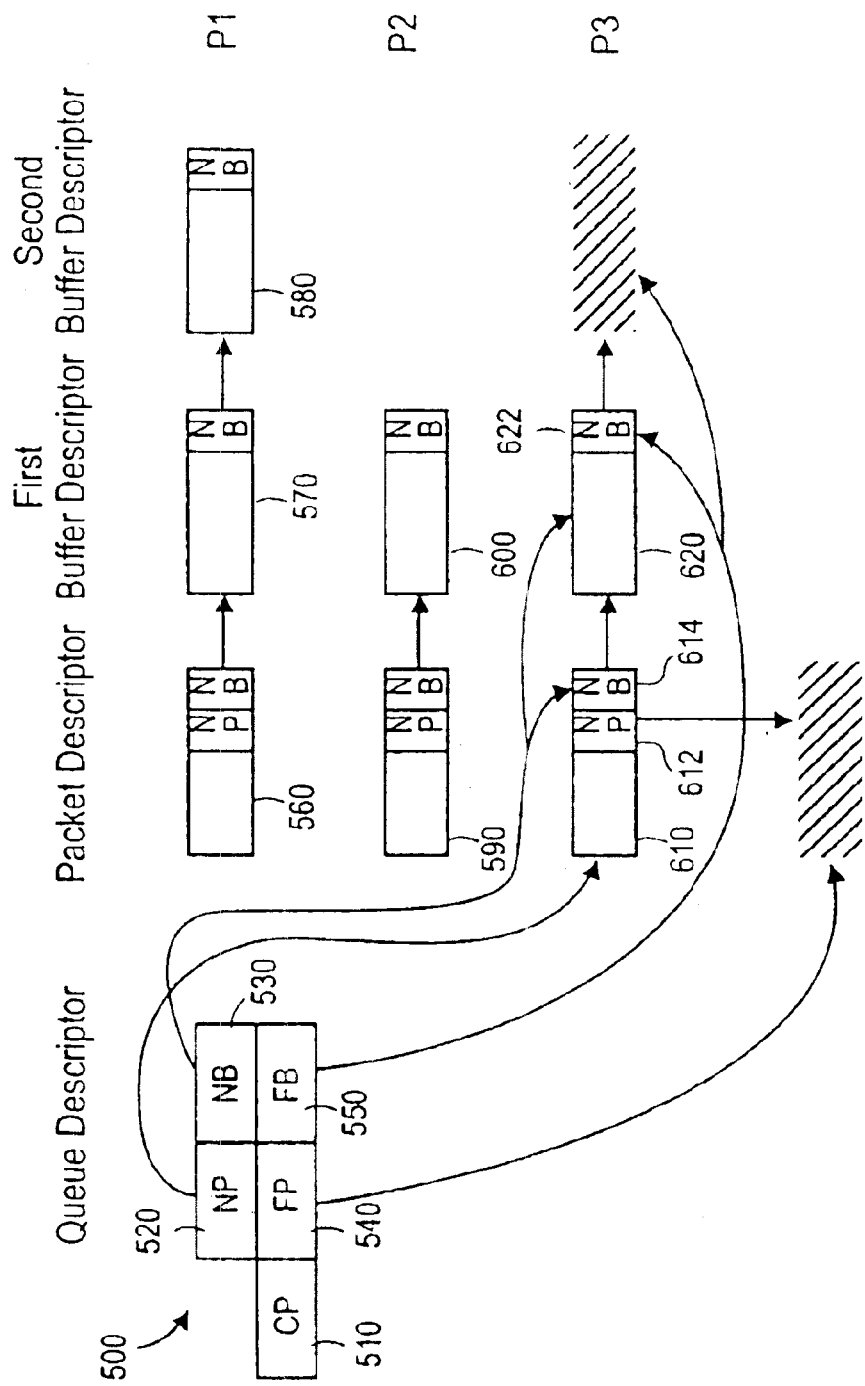
FIG. 13 illustrates the state of the data structure of FIGS. 6–13 after the first buffer descriptor of a third packet P3 has been queued.

FIG. 13 illustrates the state of the data structure after the first buffer descriptor of a third packet P3 has been queued for the VC illustrated in FIGS. 6–12. CP 510 is currently pointing to packet descriptor 610. Initially VCNP 520 points to a memory space where the first packet descriptor is to be written (see FIG. 12). Likewise, VCNB 530 points to a memory space where the first buffer descriptor is to be written. Thus, when the third packet P3 is queued (and after packets P1 and P2 have been de-queued), VCNP 520 points to packet descriptor 610 of packet P3, and VCNB 530 points to first buffer descriptor 620 of packet P3. As above, VCNP 520 points to the next packet to be served for transmission (de-queued) for that particular VC. Thus, VCNP 520 points to packet descriptor 610 until dequeueing commences. Similarly, VCNB 530 points to first buffer descriptor 620 until the dequeueing process commences. The value of VCNB 530 is copied to NB 614 of packet descriptor 610, such that NB 614 also points to first buffer descriptor 620.

VCFP 540 of FIG. 13 points to a memory address where the next packet descriptor to be queued is to be stored. The value of VCFP 540 is copied to NP 612 of packet descriptor 610. That is NP 612 points to the memory address where the next packet descriptor is to be stored. VCFB 550 points to a memory address where the next buffer descriptor to be queued is to be stored. In this particular example, VCFB 550 points to the memory address where the second buffer descriptor for the packet P3 is to be stored. The value of VCFB 550 is copied to NB 622 of packet descriptor 620. That is, NB 622 also points to the memory address where the second buffer descriptor for P3 is to be stored. As above, upon de-queuing packet P3, VCNP 520 and VCNB 530 will indicate the next packet descriptor and next buffer descriptor to be de-queued, respectively.

Figure 14:
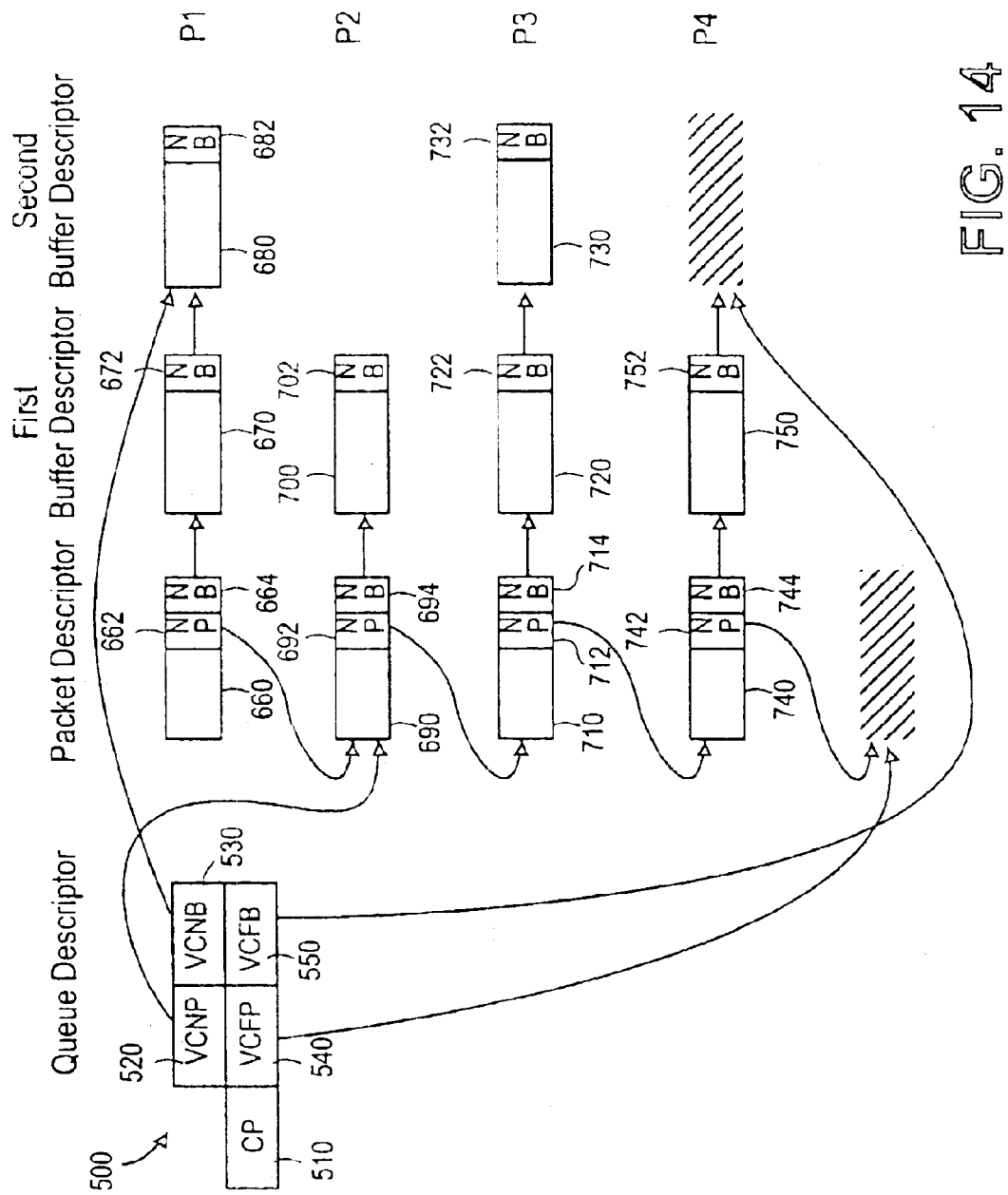
FIG. 14 illustrates an example of simultaneous queuing and de-queuing from a two-dimensional link list for a particular VC according to an embodiment of the present invention.

FIG. 14 illustrates simultaneous queuing and de-queuing from a two-dimensional link list for a particular VC according to an embodiment of the present invention. In FIG. 14, packet P1 is being de-queued and packet P4 is being queued. CP 510 is pointing to packet descriptor 740. Packet descriptor 660 of packet P1 has already been processed and the first buffer descriptor 670 of packet P1 is being processed (de-queued). Also, simultaneously, first buffer descriptor 750 of packet P4 is being queued.

The process of de-queuing will first be discussed. Initially, VCNP 520 points to packet descriptor 660 indicating that packet descriptor 660 is the next packet to be de-queued. Also, CP 510 points to packet descriptor 740 and VCFP 540 points to a new, unused memory space. Therefore, CP 510 ≠ VCNP 520 and VCNP 520 ≠ VCFP 540, indicating that a packet is available for de-queuing. When packet descriptor 660 was processed, NP 662 was copied into VCNP 520, so that, as shown, VCNP 520 points to the next packet in the queue to be de-queued, namely packet descriptor 690. When packet descriptor 690 is processed, NP 692 will be copied to VCNP 520 so that VCNP 520 will point to packet descriptor 710. Initially, VCNB 530 pointed to buffer descriptor 670 indicating that buffer descriptor 670 was the next buffer to be de-queued. However, as buffer descriptor 670 was processed, NB 672 was copied to VCNB 530. Now, as shown, buffer descriptor 680 is the next buffer descriptor to be processed. When buffer descriptor 680 is processed, the system will read the EOP bit. When the process of the buffer descriptor is done and the EOP bit is not set, the system will read VCNB 530 to determine the next buffer descriptor. When the process of the buffer descriptor is done and the EOP bit is set, as is the case here, the system will read VCNP 520 to determine the next packet descriptor in the queue to be processed, namely packet descriptor 690. When packet descriptor 690 is processed, NB 694 will be copied into VCNB 530 so that buffer descriptor 700 will be the next buffer descriptor to be processed.

As shown in FIG. 14, packet descriptor 740 of packet P4 has been queued. Packet descriptor 740 was written to the memory space pointed to by VCFP 540. Thereafter, VCFP 540 and VCFB 550 were replaced with the values of NP 742 and NB 744 of packet descriptor 740, respectively. When first buffer descriptor 750 of packet P4 was queued, it was written to the memory space pointed to by VCFB 550, which is the same as NB 744. Thereafter, VCFB 550 was replaced with a new value and that value was copied to NB 752 of buffer descriptor 750. If a new buffer descriptor (second buffer descriptor for P4) is added to the link list, the system will fetch a new pointer from the pointer pool and assign it to be the NB of the second buffer descriptor, and the system will write the new buffer descriptor into the address pointed to by VCFB 550. Then, VCFB 550 will be replaced with the NB of the second buffer descriptor. If a new packet (P5) is queued into the link list, the system will fetch two new pointers and assign them to the NP and NB in the P5 packet descriptor respectively. The system will write the P5 packet descriptor into the address that VCFP 540 is pointing to. Then, VCFP 540 and VCFB 550 are assigned the same value as the NP and NB of the P5 packet descriptor, respectively.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although only two implementations of processing engine 10 are shown in FIGS. 2 and 3, it will be readily apparent to one of skill in the art that processing engine 10 can be used in a variety of applications, including, but not limited to, implementation in various network interface cards, switches, routers, adapters, and the like. Therefore, the scope of the appended claims should be accorded the broadest interpretation so as to encompass all such modifications and similar arrangements.

What is claimed is:

1. In a networking system device, a method of queuing one or more data packets for transmission for a virtual connection (VC), wherein each of the data packets has a data field, the method comprising the steps of:

creating a VC queue descriptor associated with a first VC, wherein the VC queue descriptor includes:
   a) a first pointer pointing to a first memory space;
   b) a second pointer pointing to a second memory space;
   c) a third pointer pointing to a third memory space; and
   d) a fourth pointer pointing to a fourth memory space, wherein each of the first, second, third and fourth pointers has a value indicating the location of the associated memory space;

storing a first packet descriptor associated with a first one of the packets to the first memory space such that the first pointer points to the first packet descriptor, the first packet descriptor including a next packet descriptor pointer pointing to the third memory space, and a buffer descriptor pointer pointing to the second memory space; and storing a first buffer descriptor to the second memory space such that the second pointer points to the first buffer descriptor, the first buffer descriptor including a next buffer descriptor pointer pointing to the fourth memory space, and a buffer pointer pointing to a first buffer memory space, wherein at least a first portion of the data field of the first packet is stored in the first buffer memory space.

2. The method of claim 1, wherein the data field of the first packet includes said first portion and a second portion, the method hither including the step of storing a second buffer descriptor to the fourth memory space such that the next buffer descriptor pointer of the first buffer descriptor points to the second buffer descriptor, the second buffer descriptor including a second buffer pointer pointing to a second buffer memory space, wherein the second portion of the data field of the first packet is stored in the second buffer memory space.

3. The method of claim 2, further comprising the step of changing the value of the fourth pointer so that the fourth pointer points to a fifth memory space.

4. The method of claim 3, wherein the second buffer descriptor includes a second next buffer descriptor pointer, the method further including the step of copying the value of the fourth pointer to the second next buffer descriptor pointer of the second buffer descriptor such that the second next buffer descriptor pointer points to the fifth memory space.

5. The method of claim 3, further including the steps of:
storing a second packet descriptor associated with a second one of the packets to said third memory space such that the next packet descriptor pointer of the first packet descriptor points to the second packet descriptor, the second packet descriptor including a second next packet descriptor pointer, and a second buffer descriptor pointer pointing to the fifth memory space; and
storing a third buffer descriptor to the fifth memory space such that the second buffer descriptor pointer points to the third buffer descriptor, the third buffer descriptor including a third next buffer descriptor pointer, and a third buffer pointer pointing to a third buffer memory space, wherein at least a first portion of the data field of the second packet is stored in the third buffer memory space.

6. The method of claim 5, further comprising the steps of:
changing the value of the third pointer so that the third pointer points to a sixth memory space; and
copying the value of the third pointer to the second next packet descriptor pointer of the second packet descriptor such that the second next packet descriptor pointer points to the sixth memory space.

7. The method of claim 5, further comprising the step of changing the value of the fourth pointer so that the fourth pointer points to a seventh memory space.

8. The method of claim 7, further comprising the step of copying the value of the fourth pointer to the third next buffer descriptor pointer of the third buffer descriptor such that the third next buffer descriptor pointer points to the seventh memory space.

9. The method of claim 2, wherein the first and second buffer memory spaces are non-contiguous.

10. The method of claim 1, wherein the data field of said first packet includes only said first portion, the method further including the steps of:
storing a second packet descriptor associated with a second one of the packets to said third memory space such that the next packet descriptor pointer of the first packet descriptor points to the second packet descriptor, the second packet descriptor including a second next packet descriptor pointer, and a second buffer descriptor pointer pointing to the fourth memory space; and
storing a second buffer descriptor to the fourth memory space such that the second buffer descriptor pointer points to the second buffer descriptor, the second buffer descriptor including a second next buffer descriptor pointer, and a second buffer pointer pointing to a second buffer memory space, wherein at least a first portion of the data field of the second packet is stored in the second buffer memory space.

11. The method of claim 10, further comprising the steps of:
changing the value of the third pointer so tat the third pointer points to a fifth memory space; and
changing the value of the fourth pointer so that the fourth pointer points to a sixth memory space.

12. The method of claim 11, further including the steps of:
copying the value of the third pointer to the second next packet descriptor pointer of the second packet descriptor such that the second next packet descriptor pointer of the second packet descriptor points to the fifth memory space; and
copying the value of the fourth pointer to the second next buffer descriptor pointer of the second buffer descriptor such that the second next buffer descriptor pointer of the second buffer descriptor points to the sixth memory space.

13. The method of claim 12, wherein the data field of the second packet includes said first portion and a second portion, the method further including the step of storing a third buffer descriptor to the sixth memory space such that the next buffer descriptor pointer of the second buffer descriptor points to the third buffer descriptor, the third buffer descriptor including a third buffer pointer pointing to a third buffer memory space, wherein the second portion of the data field of the second packet is stored in the third buffer memory space.

14. The method of claim 13, wherein the third buffer descriptor includes a third next buffer descriptor pointer, the method further including the steps of:
changing the value of the fourth pointer so that the fourth pointer points to a seventh memory space; and
copying the value of the fourth pointer to the third next suffer descriptor pointer of the third buffer descriptor such that the third next buffer descriptor pointer points to the seventh memory space.

15. The method of claim 1, wherein the networking system device is a single-chip device having an internal memory, wherein the device is communicably coupled to one or more networks and to a local memory, wherein the step of creating the VC queue descriptor includes the step of:
fetching the first, second, third and fourth pointers from a pointer pool, wherein each of the first, second, third and fourth pointers points to a first, second, third and fourth open memory space, respectively; and
storing the VC queue descriptor to one of the local memory and the internal memory.

16. The method of claim 15, wherein the first, second, third and fourth open memory spaces are located in one of the internal memory of the network system device, the local memory and a combination of the local memory and the internal memory.

17. The method of claim 1, further including the steps of receiving at least one data cell for the first VC;
reassembling the at least one data cell into the one or more data packets;
creating the first packet descriptor associated with a first one of the data packets; and
creating the first buffer descriptor, wherein the fist buffer descriptor is associated with the first data packet.

18. The method of claim 1, further including the steps of:
receiving at least one data frame for the first VC;
reassembling the at least one data fire into the one or more data packets;
creating the first packet descriptor associated with a first one of the data packets; and
creating the first buffer descriptor, wherein the first buffer descriptor is associated with the first data packet.

19. In a networking system device, a method of queuing one or more data packets for transmission for a virtual connection (VC), wherein each of the data packets has a data field, the method comprising the steps of:

creating a VC queue descriptor associated with a first VC, wherein the VC queue descriptor includes:
a) a first pointer pointing to a fist memory space;
b) a second pointer pointing to a second memory space;
c) a third pointer pointing to a third memory space; and
d) a fourth pointer pointing to a fourth memory space, wherein each of the first, second, third and fourth pointers has a value indicating the location of the associated memory space;

storing a first packet descriptor associated with a first one of the packets to the first memory space such that the first pointer points to the first packet descriptor, wherein the first packet descriptor includes a next packet descriptor pointer pointing to the third memory space, and a buffer pointer pointing to a first buffer memory space, wherein the entire data field of the first packet is stored in the fit buffer memory space.

20. The method of claim 19, wherein the data field of said first packet includes only said first portion, the method further including the steps of:

storing a second packet descriptor associated with a second one of the packets to said third memory space such that the next packet descriptor pointer of the first packet descriptor points to the second packet descriptor, the second packet descriptor including a second next packet descriptor pointer, and a buffer descriptor pointer pointing to the fourth memory space; and storing a first buffer descriptor to the fourth memory space such that the buffer descriptor pointer points to the first buffer descriptor, the first buffer descriptor including a next buffer descriptor pointer, and a second buffer pointer pointing to a second buffer memory space, wherein at least a first portion of the data field of the second packet is stored in the second buffer memory space.

21. The method of claim 20, further comprising the steps of:

changing the value of the third pointer so that the third pointer points to a fifth memory space; and changing the value of the fourth pointer so that the fourth pointer points to a sixth memory space.

22. The method of claim 21, further including the steps of:

copying the value of the third pointer to the second next packet descriptor pointer of the second packet descriptor such that the second next packet descriptor pointer of the second packet descriptor points to the fifth memory space; and copying the value of the fourth pointer to the next buffer descriptor pointer of the first buffer descriptor such that the next buffer descriptor pointer of the first buffer descriptor points to the sixth memory space.

23. The method of claim 22, wherein the data field of the second packet includes said first portion and a second portion, the method fiber including the step of storing a second buffer descriptor to the sixth memory space such that the next buffer descriptor pointer of the first buffer descriptor points to the second buffer descriptor, the second buffer descriptor including a second buffer pointer pointing to a third buffer memory space, wherein the second portion of the data field of the second packet is stored in the third buffer memory space.

* * * * *

UNITED STATES PATENT AND TRADEMARK OFFICE
CERTIFICATE OF CORRECTION

PATENT NO. : 6,724,767 B1
DATED : April 20, 2004
INVENTOR(S) : Chong et al.

It is certified that error appears in the above-identified patent and that said Letters Patent is hereby corrected as shown below:

Column 10,
Line 56, delete ":" and insert -- $\neq$ --.
Line 56, delete "# " and insert -- $\neq$ --.
Line 58, delete "$pkt_{13}$" and insert -- pkt --.

Column 12,
Line 60, delete "hither" and insert -- further --.

Column 14,
Line 30, delete "suffer" and insert -- buffer --.

Column 15,
Line 5, delete "fist" and insert -- first --.

Column 16,
Line 25, delete "fiber" and insert -- further --.

Signed and Sealed this

Third Day of August, 2004

JON W. DUDAS
*Acting Director of the United States Patent and Trademark Office*